United States Patent [19]

Ueki

[11] Patent Number: 6,065,022
[45] Date of Patent: *May 16, 2000

[54] SCROLL CONTROL FOR A TABLE DISPLAY

[75] Inventor: Hiroshi Ueki, Fussa, Japan

[73] Assignee: Casio Computer Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/555,517

[22] Filed: Nov. 8, 1995

[30] Foreign Application Priority Data

Nov. 15, 1994 [JP] Japan ..................................... 6-280459

[51] Int. Cl.[7] ....................................................... G06F 17/22
[52] U.S. Cl. ............................ 707/503; 707/504; 707/509
[58] Field of Search ..................................... 395/764, 765, 395/770, 771, 782, 788, 333, 334, 339, 341, 342; 345/55, 114, 115, 123, 124, 333, 334, 339, 341, 342; 707/503, 504, 509, 510, 520, 526

[56] References Cited

U.S. PATENT DOCUMENTS

| | | | |
|---|---|---|---|
| 5,021,973 | 6/1991 | Hernandez et al. | 395/765 |
| 5,040,131 | 8/1991 | Torres | 395/352 |
| 5,142,669 | 8/1992 | Inoue et al. | 395/341 |
| 5,175,813 | 12/1992 | Golding et al. | 395/340 |
| 5,317,306 | 5/1994 | Abraham et al. | 345/118 |
| 5,337,405 | 8/1994 | Lindauer et al. | 395/764 |
| 5,339,390 | 8/1994 | Rbertson et al. | 395/341 |
| 5,510,808 | 4/1996 | Cina, Jr. et al. | 345/123 |
| 5,544,298 | 8/1996 | Kanavy et al. | 395/342 |
| 5,590,256 | 12/1996 | Tchao et al. | 395/787 |

Primary Examiner—Stephen S. Hong
Attorney, Agent, or Firm—Frishauf, Holtz, Goodman, Langer & Chick, P.C.

[57] ABSTRACT

After any cell area to be an always displayed area of an edition area composed of rows and columns of cells is designated, and a scroll display operation is performed, a CPU performs a normal scroll display until the always displayed area reaches an edge of the edition area, at which time the CPU scrolls and displays only an area excluding the always displayed area to thereby refer to cells efficiently even when a table whose size cannot be displayed on a single display screen is edited.

3 Claims, 6 Drawing Sheets

FIG.4A

DESIGNATE E5-F6

34

32 — PLEASE DESIGNATE ALWAYS DISPLAYED CELLS

FIG.4B

SCROLL THIS AREA ALONE

FIG.4C

SCROLL THIS AREA ALONE

SCROLL CONTROL FOR A TABLE DISPLAY

BACKGROUND OF THE INVENTION

1. Field of the Invention

The present invention relates to display processors which display data in a spreadsheet, table, etc., on a display screen.

2. Description of the Related Art

Recently, spreadsheet processors which use a personal computer, etc., have been used very frequently.

As shown in FIG. 5B, in a spreadsheet processor of this type, data is input to the respective vertically and horizontally arranged cells of a table to complete same or calculation expressions are set for the respective cells of the table to perform a spreadsheet calculation automatically to thereby create a desired one of various tables such as sales ones. In this case, to perform a calculation, a calculation expression designates in absolute coordinates the position of a cell where data is to be referred to with a left upper point of the table as a reference.

A cell calculation process based on the designation of the cell coordinates is effective when a frequently changing data group is totalized, and is used very often in the spreadsheet.

However, when a calculation expression is set in a cell to perform a spreadsheet process by inputting the calculation expression, as mentioned above, the operator is required to remember a cell whose coordinates are referred to.

When the coordinates of a cell to be referred to are forgotten or unclear, it is required to confirm the cell coordinates, but the size of a table to be displayed on a display screen is limited. Thus, with a large table (cell data area), a series of operations is required in which the edition display screen is scrolled horizontally and vertically to locate a desired cell and confirm its coordinates and is returned to a cell in which its coordinates data is to be developed. More specifically, as shown in FIG. 6, when a calculation expression using the coordinates of cells N and M is set in a cell having coordinates (C3), the edition display screen is required to be scrolled until that cell is located. If the desired cell is located, the edition screen is required to be scrolled back in the reverse direction to return to the original cell in which the coordinates of the located desired cell should be set.

Thus, as long as coordinates at which all the input cell data is developed are not remembered, such processing is indispensable and the efficiency of creation or edition of a table is low.

A conventional technique which solves the above problems by always displaying data to be referred to on the display screen in spite of scrolling is a display screen dividing method.

This involves dividing the display screen vertically (or horizontally) into two portions with a desired row (or column) position as a reference and using one of the two display screen portions as a fixed one and the other as a scrollable varying one.

However, with this screen dividing method, when the display screen is divided along a vertical line into two display portions, the operator can optionally designate a row position as a reference of division. In this case, the display area is only dividable into two portions with the reference row position as a boundary.

This applies to division of the display screen along a horizontal line.

Thus, even when there is a specified display area which is to be always displayed in a part of substantially the central portion of the display screen, the conventional display screen dividing method only divides the display screen into two such that the specified display area is contained in a fixed display screen area portion. In this case, a considerable portion of the display screen is specified as a fixed display area, so that a scrollable varying display screen area is very narrow. Thus, data displayed on the varying narrow display screen area is very difficult to view.

SUMMARY OF THE INVENTION

It is therefore a first object of the present invention to specify a display area of a data display screen to cause the display area to always display the data in a desired display range specified by designating its starting and end positions.

A second object of the present invention is to minimize an area to be always displayed to thereby increase a scrollable display area.

In order to achieve the above objects, the present invention provides a display processor for displaying data on a display screen, comprising:

starting position designation means for designating a starting position of the range of a specified area of that part of data to be displayed on the display screen which is to be always displayed;

end position designating means for designating the end position of the range of the specified area;

determination means for determining a scroll display area and an always displayed area on the display screen on the basis of the range of the specified area which is designated by the designated starting and end positions such that the specified area is always displayed on the display screen; and display control means for fixing and displaying the data in the specified area in the always displayed area on the display screen determined by the determining means and for scrolling the displayed data in the scroll display area on the display screen determined by the determining means, when the vertical or horizontal scrolling of the displayed data is designated.

Thus, according to the present invention, that part of data displayed on a display screen and which is in a desired display range specified by designating its starting and ending positions is specified as being displayed in a display area displayed always on the display screen. The range of the display area to be truly displayed is specified to minimize the display area to be always displayed to thereby increase the scrollable display area and hence use the display screen effectively while desired display data has been conventionally fixed only in one of two divided portions of the display screen.

BRIEF DESCRIPTION OF THE DRAWINGS

FIGS. 4A, 4B and 4C illustrate a transition of an edition display screen indicative of the operation of the display processor;

DETAILED DESCRIPTION OF THE PREFERRED EMBODIMENT

Figure 1:
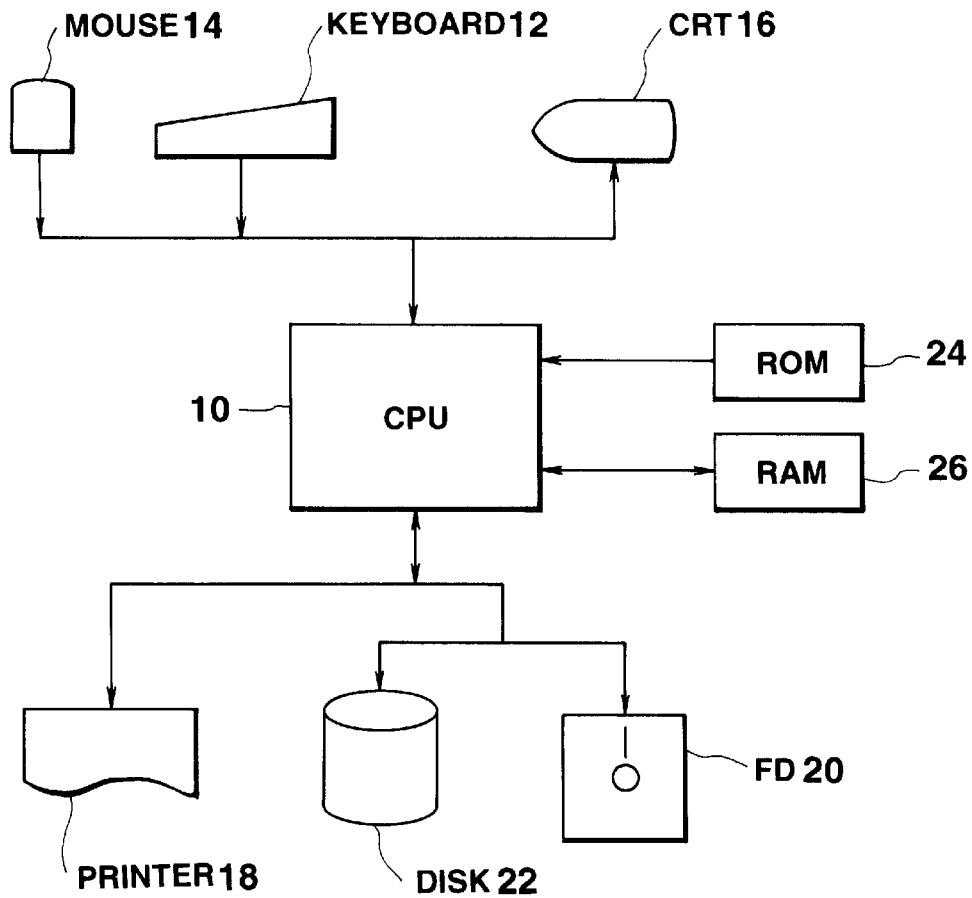
FIG. 1 is a block diagram of a display processor as an embodiment of the present invention.

One embodiment of a display processor according to the present invention will be described next with reference to FIGS. 1–5A. FIG. 1 shows the structure of the embodiment of the display processor. In FIG. 1, reference numeral 10 denotes a CPU which controls the whole display processor; 12, a keyboard which is used to input data/a calculation expression; 14, a pointing device (mouse) as an auxiliary input device; 16, a CRT as a display; 18, a printer as a book sheet output device; 20, a floppy disk (FD) as an external storage; 22, a hard disk (DISK) as an external storage of a large capacity; 24, a ROM which contains spreadsheet calculation programs executed by CPU 10; and 26, a RAM used as a work area by CPU 10. Of course, the spreadsheet calculation program may be read into RAM 26 from DISK 22 for executing purposes.

Figure 2:
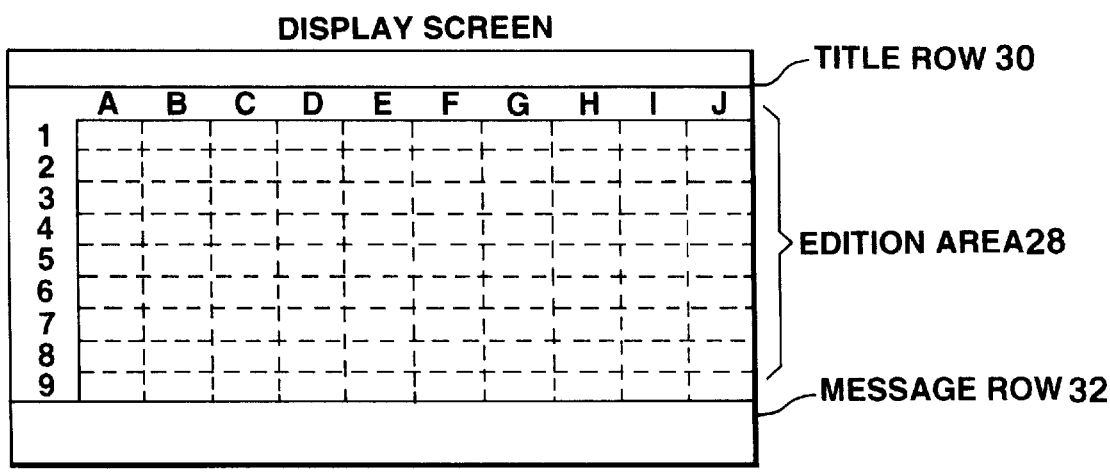
FIG. 2 illustrates an edition screen of the display processor.

FIG. 2 shows an edition display screen for spreadsheet calculation to be displayed on CRT 16. As shown in FIG. 2, the edition screen is composed of an edition area 28 where cells are displayed, and a title row 30 and a message row 32 provided above and below the edition area 28.

Figure 3:
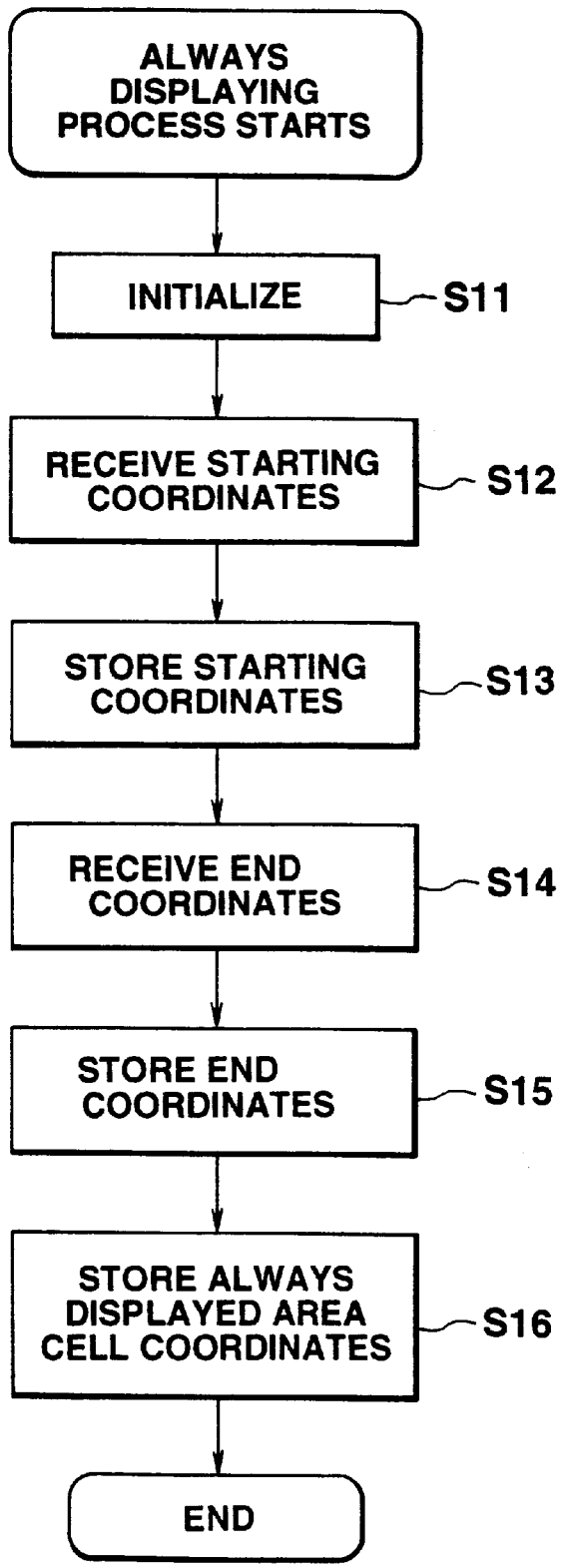
FIG. 3 is a flow chart of an always displayed area setting process in the display processor.

The operation of the display processor having such structure will be described next. FIG. 3 is an operational flow chart of an always displayed area setting process performed in the display processor of this embodiment. The normally displayed area involves always displayed cells without going away from the display screen even when the scrolling process is performed.

When an always displayed area designating command is input by the keyboard or mouse to start this process, first, initialization is performed (step S11) which includes, for example, a process for securing in RAM 26 a memory required for execution of this process and a process for display of a message such as "Please designate always displayed cells." in message row 32, as shown in FIG. 4A.

Starting (cell) coordinates for designation of an always displayed area input by the operation of keyboard 12 or mouse 14 are received (step S12) and data on the designated cell coordinates is stored in the memory (step S13). Similarly, input end (cell) coordinates of the designated area are received (step S14) and stored in the memory (step S15), and data on the cell coordinates of the always displayed area is stored (step S16).

For example, in the display screen of FIG. 4A, the starting and end cell coordinates are designated by E5 and F6, respectively. In this case, a rectangular area having those cells as diagonal ones is designated as the always displayed area, which is 2 rows×2 columns (4 cells in all) defined by E5, E6, F5 and F6 in this example.

Figure 5A:
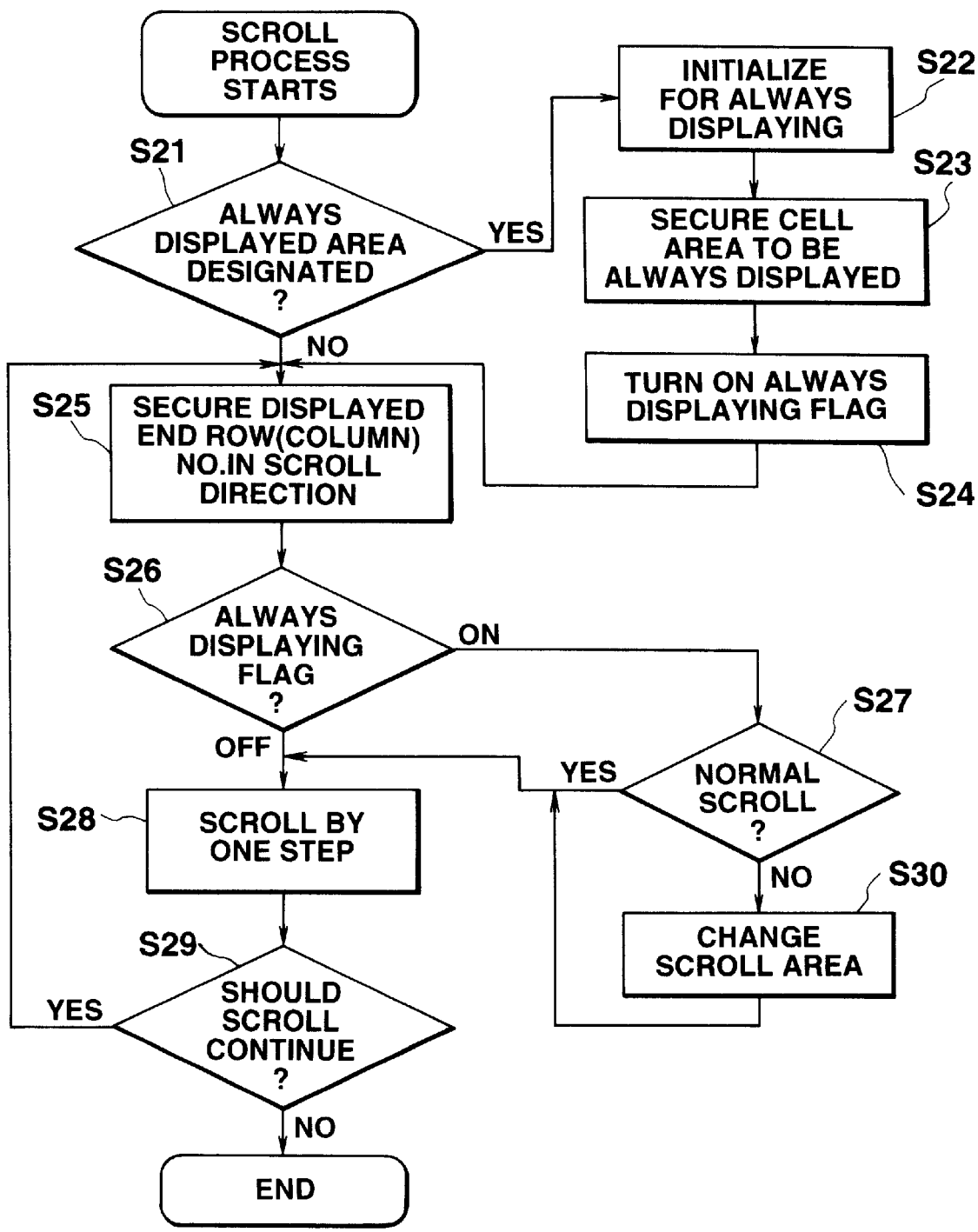
FIG. 5A is a flow chart of the scrolling operation of the display processor.
Figure 5B:
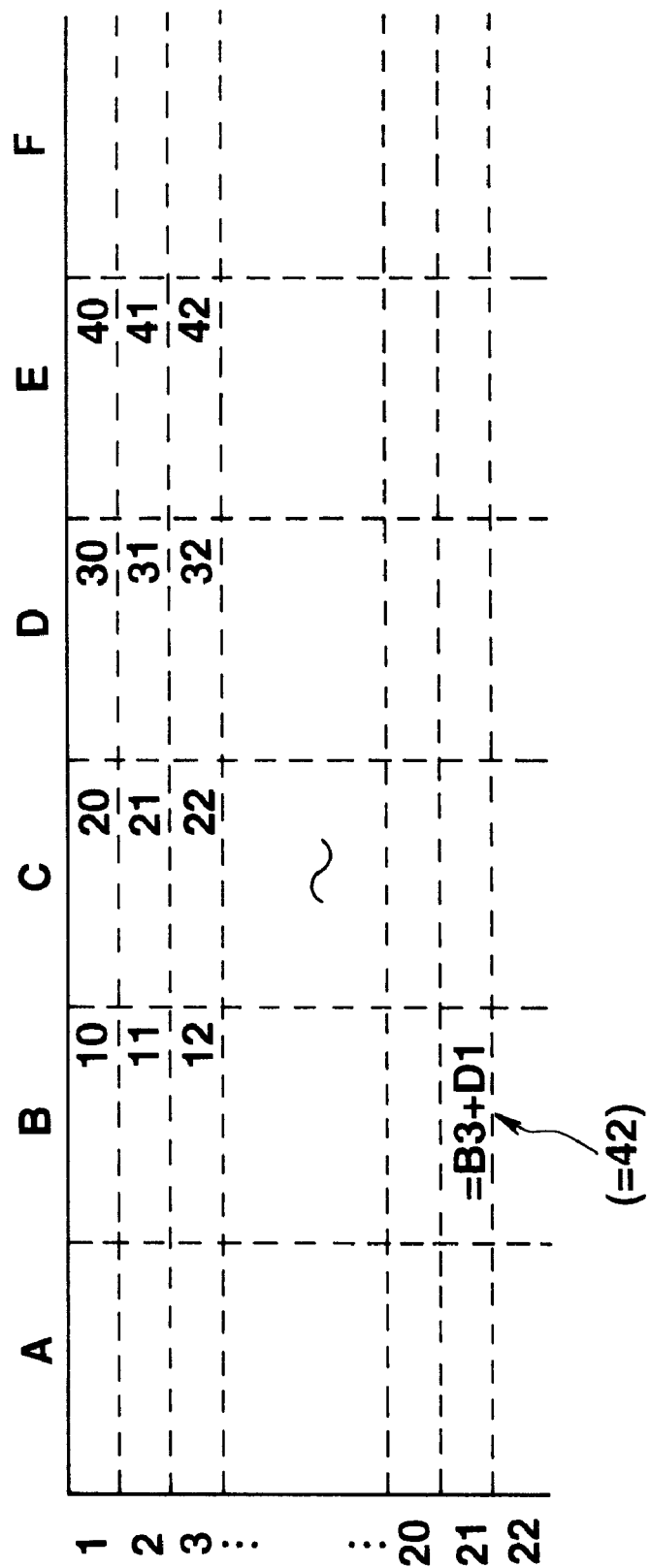
FIG. 5B illustrates cells in the display processor.
Figure 6:
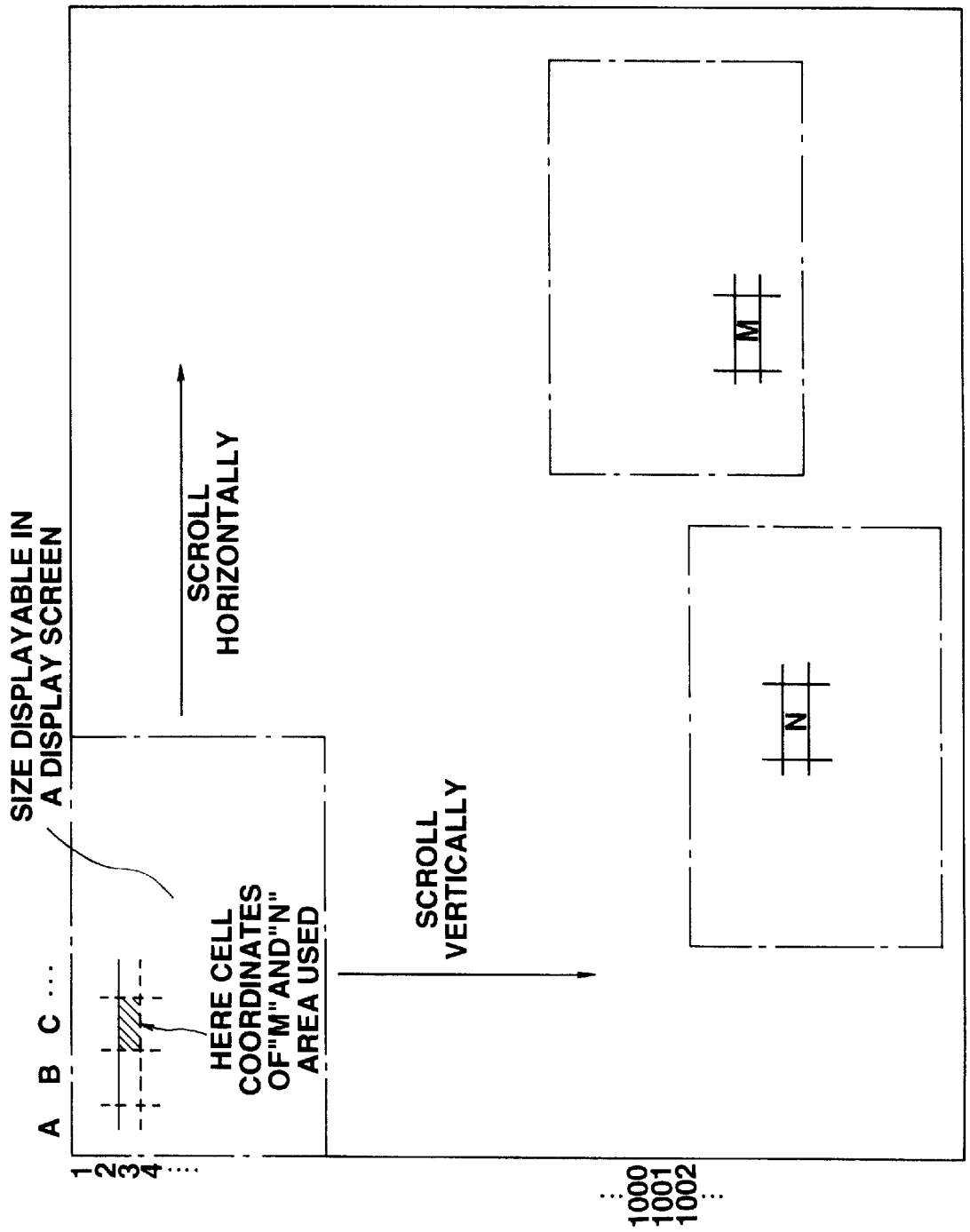
FIG. 6 illustrates problems with a conventional display processor.

The scrolling operation of the inventive display processor will be described with reference to a flow chart of FIG. 5A. When a "scroll" is designated by a roll-up or -down key or cursor key of keyboard 12, the scroll process starts. First, it is determined whether an always displayed area has been designated (step S21). If so, control passes to step S22. If otherwise, control passes to step S25 to be described later.

When the always displayed area has been designated, initialization required for securing a memory and a related process required for the scrolling process are performed (step S22). Data on coordinates of cells, etc., to be always displayed is secured in the memory (step S23). A process is performed for turning on an always displaying flag used for determining execution of the always displaying process in the subsequent operations including the scrolling process (step S24).

When no always displayed area has been designated at step S21, data on an end or leading row (or column) number of the current display screen in the scroll direction is secured in the memory (step S25). The next scrolling process changes in dependence on whether the end row (or column) number coincides with the row (or column) number of any of cells of the always displayed area.

It is then determined from the always displaying flag whether the always displaying process should be performed (step S26). If so, control passes to step S27. If otherwise, control passes to step S28 to be described later.

When the always displaying process should be performed, it is determined on the basis of the end row (or column) number of the current display screen in the scroll direction stored in the memory whether the cells of the always displayed area are at the edge of the display screen (step S27). If not, control passes to step S28, where a regular scroll process is performed. More specifically, a scroll for one row (or column) is performed (step S28). Thereafter, it is determined whether the scroll process should continue (step S29). If so, control returns to step S25.

When the display screen of FIG. 4A is scrolled vertically (for example, upwards) until the designated cells or always displayed area cells disappear from an upper edge of the display screen, the scrolling direction end row number ("5" in this example) of the current display screen stored in the memory at step S25 coincides with the row number of the cells E5 of the normally displayed area. Thus, at step S25 it is determined that the normally displayed area cells are at the edge of the display screen.

In such a case, the scroll area is changed from the whole edition area 28 to an area other than the rows (or columns) containing the normally displayed area 34 (step S30). Control then passes to step S28.

Thus, as shown in FIG. 4B, cells 3 below the third row of the display area 28 move sequentially upward with the row numbers 5 and 6 left displayed at all times.

Similarly, when the display screen is scrolled horizontally (for example, leftwards) until the designated cells or the cells of the always displayed area disappear from the left edge of the display screen, the scrolling direction end column number ("E" in this example) of the current display screen stored in the memory at step S25 coincides with the column number of the cells E5 of the always displayed area. Thus, at step S27 it is determined that the always displayed area cells are at the edge of the display screen. As shown in FIG. 4C, the cells of the third and subsequent columns of the display area 28 are scrolled sequentially leftwards with the column numbers E and F being always left displayed.

When it is determined at step S29 that no scrolling process continues, this scrolling process ends.

As described above, according to the present invention, the edition function has the function of "always displaying" such that the designated columns and rows of cells are always displayed somewhere in the display screen even when the display screen is scrolled.

Thus, there is no anxiety that the position of the original cells to return might be lost after the scrolling process is many times performed vertically and horizontally to know other cell data, etc. In addition, advantageously, data inputting can be performed with cells being left displayed which can not be displayed normally on the same display screen to thereby improve the efficiency of edition of a spreadsheet greatly.

While in the inventive embodiment an example in which a table of cells is displayed on the display screen has been described, this applies also when documents created by a word processor, etc., are displayed.

A desired area specified by the designation of the starting and end positions can be set as an always displayed area in a document display screen such that a document can be created efficiently by scrolling another area while referring to the always displayed area.

What is claimed is:

1. A display control device for displaying table data which includes a plurality of cells arranged in rows and columns on a predetermined display area, said display control device comprising:

(a) setting means for setting a cell area by desired row and column ranges in the table data;

(b) scroll instructing means for instructing said device to scroll-display the table data in any desired one of up, down, right and left directions;

(c) first scroll-displaying means, responsive to said scroll instructing means instructing said device to scroll-display the table data in one of the up, down, right and left directions in a state where the cell area set in the row and column ranges set by said setting means is not displayed at any one of upper, lower, right and left edges of the display area, for scroll-displaying a whole range of the table data containing the cell area in the desired direction;

(d) second scroll-displaying setting means, responsive to said scroll instructing means instructing said device to scroll-display the table data downwards in a state where the cell area is displayed at the upper edge of the display area, for scroll-displaying downwards a row range below the row range set by said setting means, with the row range of the cell area set by said setting means being fixingly displayed at the upper edge of the display area;

(e) third scroll displaying means, responsive to said scroll instructing means instructing said device to scroll-display the table data horizontally in the state where the cell area is displayed at the upper edge of the display area, for scroll-displaying horizontally all of the table data including the row range of the cell area displayed at the upper edge of the display area; and (f) fourth scroll-displaying means, responsive to said scroll instructing means instructing said device to scroll-display the table data downwards or rightwards in a state where the cell area is displayed at an upper left edge of the display area, for scroll-displaying downwards or rightwards the row range below the row range set by said setting means or a column range on a right side of the column range set by said setting means, with the row or column range of the cell area set by said setting means being fixingly displayed at the upper left edge of said display area.

2. The display control device according to claim 1, further comprising:

(g) fifth scroll-displaying means, responsive to said scroll instructing means instructing said device to scroll-display the table data rightwards in a state where the cell area is displayed at the left edge of the display area, for scroll-displaying rightwards the column range on the right side of the column range set by said setting means, with the column range of the cell area set by said setting means being fixingly displayed at the left edge of the display area; and (h) sixth scroll-displaying means, responsive to said scroll instructing means instructing said device to scroll the table data vertically in the state where the cell area is displayed at the left edge of the display area, for vertically scroll-displaying all of the table data including the column range of the cell area displayed at the left edge of the display area.

3. The display control device according to claim 1, further comprising:

(i) seventh scroll-displaying means, responsive to said scroll instructing means instructing said device to scroll the table data upwards in a state where the cell area is displayed at the lower edge of the display area, for scroll-displaying upwards a row range above the row range set by said setting means, with the row range of the cell area set by said setting means being fixingly displayed at the lower edge of the display area;

(j) eighth scroll-displaying means, responsive to said scroll instructing means instructing said device to scroll the table data leftwards in a state where the cell area is displayed at the right edge of the display area, for scroll-displaying leftwards a column range on a left side of the column range set by said setting means, with the column range of the cell area set by said setting means being fixingly displayed at the right edge of the display area; and (k) ninth scroll-displaying means, responsive to said scroll instructing means instructing said device to scroll the table data upwards or leftwards in a state where the cell area is displayed at a lower right edge of the display area, for scroll displaying upwards or leftwards the row range above the row range set by said setting means or the column range on the left side of the column range set by said setting means, with the row or column range of the cell area set by said setting means being fixingly displayed at a lower right edge of the display area.

* * * * *